Figure 3A:
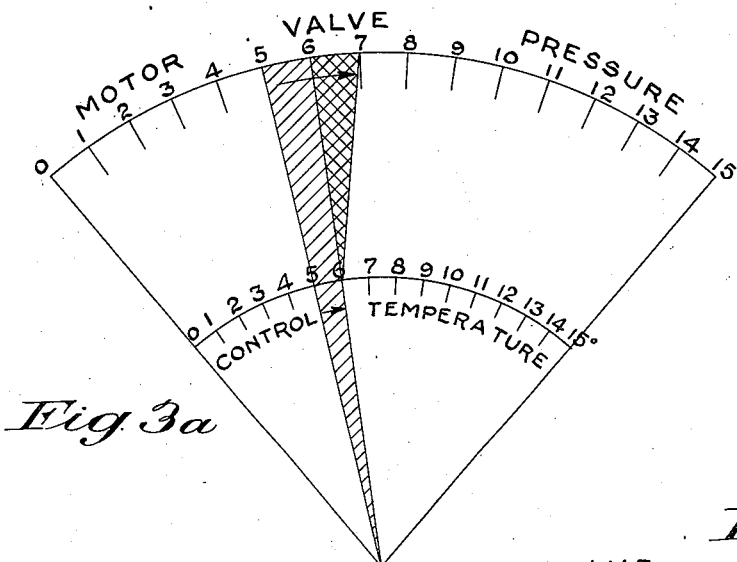

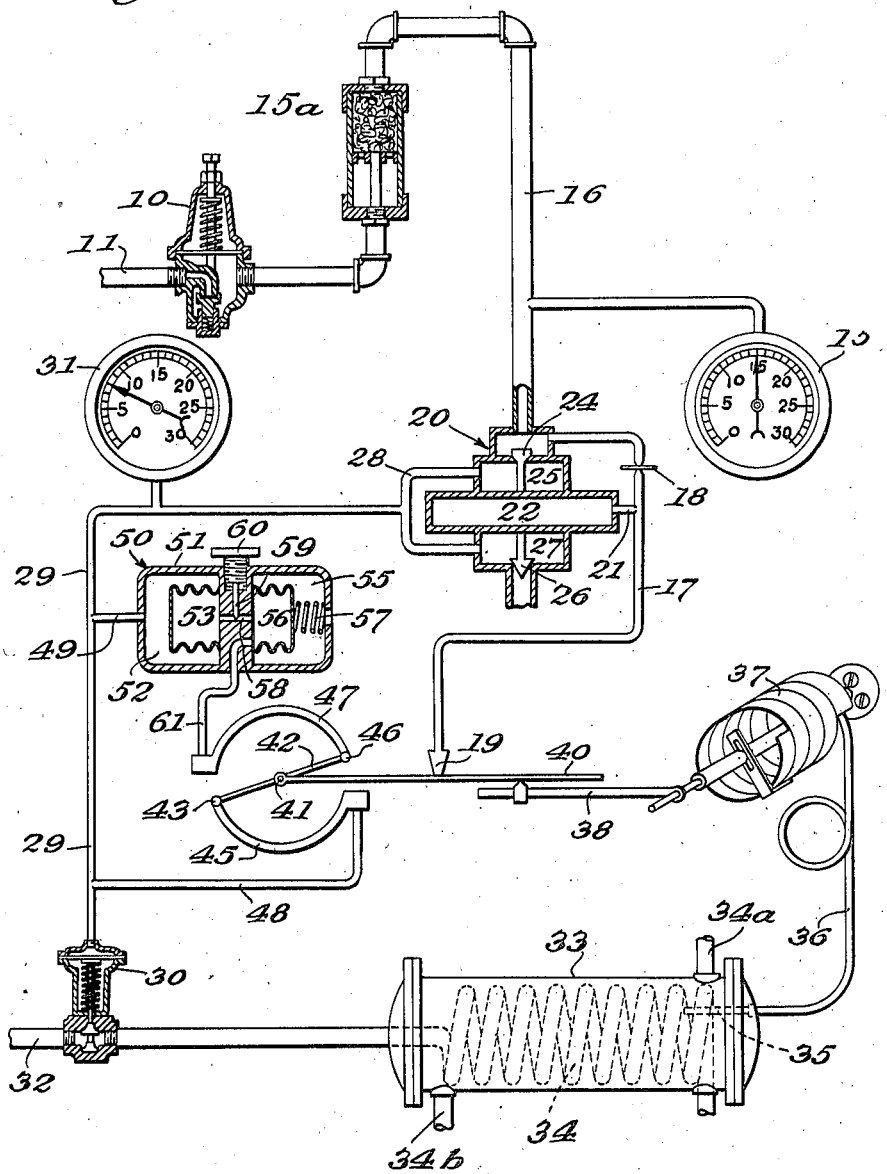

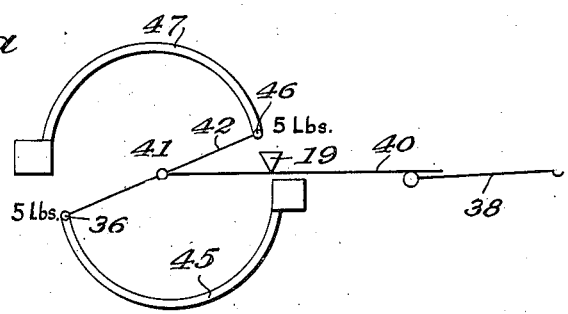
Fig. 2a — DIFFERENTIAL = 0 STATIC BALANCE
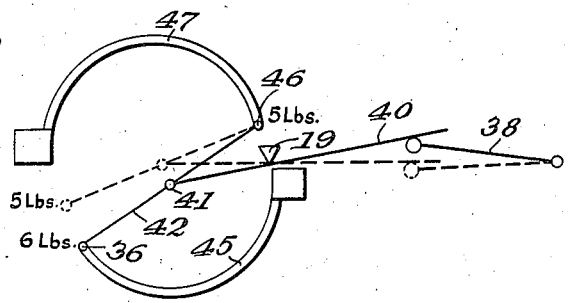
Fig. 2b — DIFFERENTIAL 1 POUND
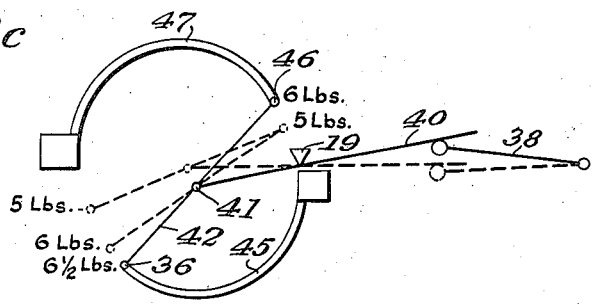
Fig. 2c — DIFFERENTIAL ½ POUND
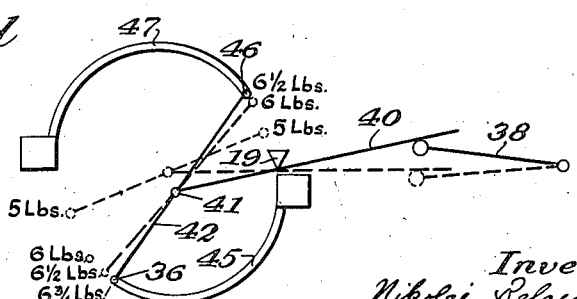
Fig. 2d — DIFFERENTIAL ¼ POUND Inventor.
Nikolai Belaef
By Dike Calver, & Gray
Attorneys.

Patented Oct. 17, 1939

2,176,603

UNITED STATES PATENT OFFICE 2,176,603

SELF-STABILIZING CONTROL MECHANISM

Nikolai Belaef, Boston, Mass., assignor to Mason-Neilan Regulator Company, Boston, Mass., a trust Application April 8, 1936, Serial No. 73,297

12 Claims. (Cl. 236—82)

This invention relates to instruments or other means used to control the magnitude of a variable condition either by change in temperature, pressure, flow, or level, and particularly to such controls as are entirely or partly fluid operated.

Controls of this type are adapted to operate in conjunction with a servo-motor, such as a pressure actuated valve, for controlling a medium by which the magnitude of the condition is governed, and the change in fluid pressure necessary for the operation of the valve is determined by the advance and recession of an element responsive to changes in the condition. It is well known that a control mechanism of this type, when adjusted to high sensitivity will "hunt" or oscillate violently causing rapid deviation in the magnitude of the condition to be controlled above and below the control point. On the other hand, when adjusted to a low sensitivity, although stable, it will not be sufficiently responsible and may cause gradual "drift" or prolonged deviation in the condition of fluid to be controlled from the control point due to the effect of temporary changes in the physical condition within the system.

Attempts have been made to overcome "drift" by using a pressure responsive element subjected to the motor valve operating pressure through an adjustable lag or retarding means to gradually increase or decrease the effect produced by the primary element, which is the element responsive to changes in the magnitude of the condition, by a series of successive valve movements until checked and reversed by the primary element. Mechanism of this type has been used with the object of returning the variable condition to the true setting by checking and reversing the action of the drift compensator mechanism through the primary element, with the result that the line of control has more or less drift above and below the true setting depending on conditions and the sensitivity of the instrument.

My invention is based on a fundamentally different principle and has for its object to attain utmost stability of operation combined with high sensitivity to the variations in the condition of the fluid to be controlled, so that only a minute deviation from the control position within the selected "control band" be required in order to produce the desired effect.

Also the object of this invention is to provide a means, whereby a series of small consecutive deviations of the sensitive element from the control position produces a series of consecutive additional but retarded effects on the control valve. These time retarded effects may be many times larger than the initial simultaneous impulses so that the complete motor valve range may easily be dominated without recession of the sensitive element beyond the limits of a small selected "control band".

Another object is to provide a means whereby the ratio between the magnitude of the immediate effect on the control valve, due to a unit deviation of the sensitive element from the control position, will be easily adjustable with respect to the additional time retarded effect caused by the above immediate effect and thus the magnitude of the "control band" is easily synchronized with the process lag.

It is an object, also, to attain an automatic stability in the control system after each cycle, caused by the minute deviations of the sensitive element within the control band.

It is an object to provide additional stability so that mechanic vibration will not cause upsetting of the control system.

It is an object to avoid the use of adjustable leaks or bleeds which may be used in order to dampen the operation.

It is intended, also, to be able to install the device in a standard control instrument without difficulty or modification of the existing design and with only minor alterations in piping.

In order to effect the above-mentioned improvements, an auxiliary mechanism is added to the primary control system, which magnifies in a definite ratio the immediate effect produced on the motor valve by the small movement of the primary sensitive element.

For a better understanding of this invention, reference is made to the accompanying drawings:

Fig. 1 is a diagrammatic view of one form of my self-stabilizing control mechanism as adapted to temperature control in an industrial process.

Fig. 2—a, b, c and d, are diagrams illustrating the principle of "control band" self stabilizing action.

Figure 3B:
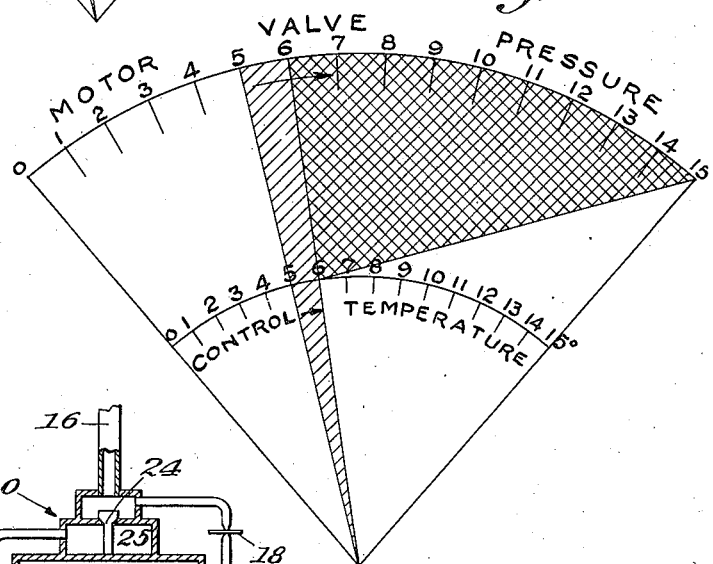

Fig. 3—a and b, are diagrams showing the relationship between temperature and motor valve pressure in my control mechanism and illustrating the operating principle of the "control band".

Figure 4:
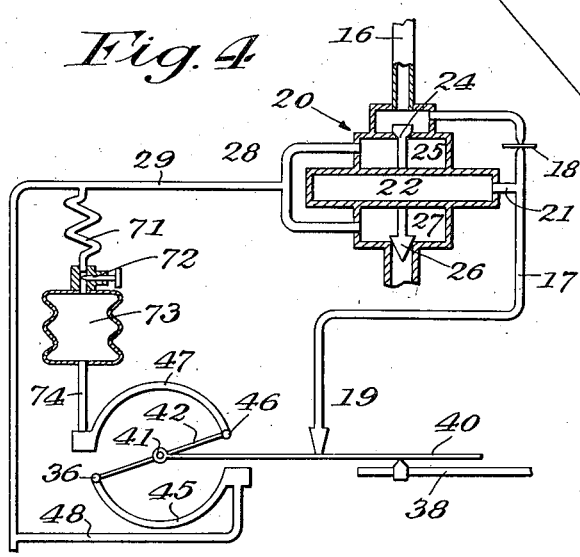

Fig. 4 is a modification of my control mechanism showing a different form of self stabilizing control means.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Referring to Fig. 1, let valve 30 control the admission of ammonia into a brine cooler 33, the temperature of brine in which is to be maintained constant as determined by the temperature sensitive element or bulb 35, ammonia being supplied through pipe 32 to coil 34, and brine entering cooler 33 and 34a and flowing out at 34b. The bulb 35 is connected by capillary tubing 36 to a pressure responsive element, such as helical tube 37, which actuates the control arm 38 in response to temperature changes of bulb 35. Bulb 35 is of the usual type, containing an expansible fluid, the pressure of which indicates temperature.

As shown, coil tube 35 unwinds under increased pressure due to rise in temperature and operates in the reverse direction when the temperature decreases. In doing so, control arm 38 swings the control lever or flapper 40 up or down around a fulcrum point 41 and causes it to close or to open the air nozzle 19. An operating air supply at constant pressure as maintained by suitable reducing valve 10, and indicated by gauge 15, comes from pipe 11 to the non-bleeding statically balanced pilot 20 through strainer 15a and pipe 16, and a small amount of air flows through the restriction 18 and pipe 17 to the nozzle 19. When an increase of temperature causes the control arm 38 to rise and to press the control lever 40 against the nozzle 19, the back pressure created in pipe 17 is communicated to a chamber 22 by a pipe 21. Chamber 22 is provided with upper and lower flexible diaphragm walls each of which form one side of chambers 25 and 27 located above and below chamber 22 in pilot 20. A stem 24, abutting the top side of diaphragm chamber 22, forms a supply valve between pipe 16 and chamber 25. A similar stem 26, abutting the lower side of diaphragm chamber 22, forms a waste valve between chamber 27 and the atmosphere. Both chambers 25 and 27 are connected from the outside by tubing 28 which leads through tubing 29 provided with a suitable pressure gauge 31 to control or motor valve 30. Back pressure in chamber 22 expands upper and lower flexible walls lifting the intake valve 24, and admitting air into chambers 25 and 27. The pressure in diaphragm chambers 25 and 27 rises until the pressure is sufficient to overcome the back pressure in chamber 22, at which time the upper flexible diaphragm of chamber 22 will collapse sufficiently to cause closing of valve 24. In the event that the pressure in 25 and 27 rises above the balance position, the diaphragms of chamber 22 will collapse further thus closing intake valve 24, and slightly opening exhaust valve 26, thereby reducing the pressure in chambers 25 and 27 until static balance is attained and both valves 24 and 26 are closed. The increase of pressure on diaphragm of valve 30 will partially open the valve increasing the flow of ammonia in the cooler and, therefore, tending to maintain the temperature in the cooler constant. As long as the temperature is kept constant, a static balance will be maintained in the motor valve line. No adjustable continuous bleeds are necessary in order to maintain a constant motor valve pressure in such control system. The air from the motor valve is exhausted only at such times as when the motor valve pressure is being reduced.

It is found, however, that a control system, as described, is often too sensitive, and is subject to over-controlling and "hunting", since it requires only a very slight movement of the control arm in order to cause comparatively large changes in the motor valve pressures.

In order to obtain a steady and even operation of the motor valve and to dampen too sudden oscillation of the control arm 38 and lever 40 a "motor valve compensator" Bourdon tube 45, or other suitable pressure responsive element, such as a bellows or the like, is connected to the motor valve line, as by pipe 48, in such a way that the free end 43 becomes a point of suspension for one end of a lever 42, another point of suspension of said lever being on the free end of Bourdon tube 47, to be hereinafter described. Lever 42 is therefore pivotally connected with the free ends of Bourdon tubes 45 and 47 and affords a pivotal mounting as indicated at 41 for lever 40, as hereinabove referred to. With fulcrum 46 stationary, increase of motor valve pressure will cause uncoiling of Bourdon tube 45, thus lowering the lever 42 and, consequently, moving the control lever 40 away from the nozzle 19 tending to reduce the back pressure in chamber 22. This simultaneous reaction of the Bourdon tube 45 results in steady throttling action of the motor valve.

By careful selection of the Bourdon tube 45, it is possible to obtain a very stable operation by increasing the throttling range so that the temperature may have to change throughout the entire operating range of the instrument in order to move the control valve from one extreme position to another.

It is found, however, that in some instances the throttling controller, although sufficiently stable, will not prevent gradual "drift" of the control temperature away from the desired position, due to the changes in the rate of controlled medium which necessitates variable opening of the control valve since, due to construction, in a throttling controller, there may be only one definite opening of the motor valve, corresponding to a definite position of the control arm 38. It will be seen, therefore, that the temperature must vary from the set point to afford valve openings required for varying process demands as will be more fully hereinafter described.

In order to retain the stability of control and, at the same time, to prevent drift of the control temperature, in a controller of this type, beyond the limits of a small selected "control band" an additional modulating system is added, according to the intent of the invention, requiring only minor alteration in piping arrangements.

The auxiliary device is made to be operative by the changes in the motor valve pressure, as affected, through the advance and recession of the temperature sensitive element of the primary control system and in such a manner that every minute instantaneous effect of the sensitive element causes a continuous retarded readjusting of control or motor valve pressure in the direction of the initial effect. The magnitude of retarded continuous adjustment is in direct proportion to the initial instantaneous effect, and upon creating such readjustment the motor valve pressure is automatically stabilized without resorting to adjustable bleeds in the motor valve line, whereby the motor valve pressure may be stabilized by proportioning the size of the adjustable leak to the continuous inflow of air, or without alternate reversals in the direction of the motion of the sensitive element.

According to the intent of this invention, the auxiliary device is made of two communicating bellows 53 and 56, Fig. 1, which are set in an enclosure 50, section 52 of which with bellows 53 is always subjected to the motor valve pressure through pipe 49; and the bellows 56 in section 55 is under tension of spring 57. A Bourdon tube 47, set on a rigid base, is in communication with bellows 56 through tubing 61. Bellows 53 and 56 are connected by conduit 58, and with Bourdon tube 47, filled with a non-compressible fluid, such as oil, form a hermetically sealed self-contained system. A needle valve 59, operated by suitable screw 60, can completely close the conduit 58 between bellows 53 and 56, or can be adjusted to diminish the size of the opening as desired. The free end of Bourdon tube 47 forms a support for the lever 42, another end of which is supported by the free end of Bourdon tube 43 as hereinabove described. It is apparent from the construction that an increase of pressure inside of bourdon tube 47 will raise pivot 46 of lever 42, and a decrease of pressure will lower it.

The modulating device operates as follows: Starting from a condition of equilibrium, a change of pressure in chamber 22 will create a differential between bellows 53 and 56 gradually forcing fluid from bellows 53 into 56, or vice versa, against the resistance of spring 57, until an equilibrium between the two sides is again established and the free end of Bourdon tube 47 moves a proportional distance, due to change in pressure. The propulsion of the fluid from one bellows to another may be very much retarded by adjusting the size of the needle valve opening, creating only a slow and gradual effect on tube 47. By shutting the opening completely, the communication between bellows may be prevented, so that a change of motor valve pressure will have no effect on Bourdon tube 47; in such a case the instrument will operate as a simple throttling controller as described before with only tube 43 active.

The function of the auxiliary device will be much easier to understand by referring to the operation of an ordinary throttling controller, as shown in Fig. 1, assuming that screw 60, controlling conduit 58, between bellows 53 and 56 is closed completely.

For illustration, let it be assumed also that such a controller is installed to maintain a constant temperature of five degrees in a brine cooler 33 by admitting liquid ammonia through valve 30. Let the total operating range of the controller be from 0° to 15°, and, for stability of control, let "motor valve compensator" tube 45 be selected to obtain 100% throttling range, that is, with temperature at 0° the motor valve is open and with temperature at 15° it is closed. Accordingly, if the pressure on top of the diaphragm of motor valve 30 varies from 0 to 15 pounds, then it is obvious that for every pound change in motor valve pressure the temperature must also change one degree.

Under such conditions, as long as the flow of the brine into cooler 33 is maintained at a rate sufficient to balance the heat taken by ammonia, the temperature in the cooler will remain constant at 5°. However, as soon as the rate of flow of brine to the cooler 33 is, for example, increased, the temperature will immediately rise, increasing the pressure on the diaphragm of motor valve 30 and admitting more ammonia. The rise of temperature will continue until the motor valve opens sufficiently to supply enough ammonia to balance the heat inflow against the outflow at the new temperature, which may be many degrees higher than that desired. This "drift" of control temperature, due to change in the rate of flow or change in condition of the controlled medium, is very undesirable.

Now, let it be assumed that the same system, as shown on Fig. 1, is again in balance with control temperature of 5° in cooler and motor valve pressure of 5 pounds, but now with the orifice governed by screw 60, between bellows 53 and 56, slightly opened. Under such conditions, there will be an equilibrium between the pressure in bellows 53, 56 and Bourdon tube 47, the free end of which will take a definite position corresponding to the pressure of 5 pounds. If there happens an increase in the rate of flow of brine to the cooler the temperature will begin to rise as previously described, for instance, one degree rise of temperature in the cooler 33 will raise the control arm 38 a corresponding distance, pressing control lever 40 closer to the nozzle 19 thus increasing the back pressure in chamber 22. This will cause expansion of flexible diaphragm walls of chamber 22 lifting the intake valve 24, and causing an increase of pressure in chambers 25 and 27, and on top of diaphragm of valve 30. This increase of motor valve pressure will immediately expand Bourdon tube 45 by lowering the free end. With point 46 stationary, the end 36 of lever 42, and fulcrum 41 of lever 40, is drawn slightly away from the nozzle 19 proportionately to the advance of the control arm 40, dampening and preventing too sudden changes and "hunting". The reaction of the motor valve compensator tube 45 is simultaneous with, and opposite in effect to, the action of the control arm 40. From the construction it follows that one degree rise in temperature from five degrees to six degrees will cause also one pound rise of motor valve pressure from five to six pounds. So far described, the controller is in no way different from a throttling type. However, as soon as the motor valve pressure changes to six pounds, the differential is created between bellows 53 and 56. High pressure in 52 will slowly force liquid from bellows 53 into bellows 56 in order to equalize the pressure between the two sides. The free end of Bourdon tube 47 will begin moving gradually up, thus lifting the end 46 of lever 42 and fulcrum point 41 of lever 40 even with control arm 38 stationary at new position of six degrees. Slow rise of fulcrum 41 will tend to press the lever 40 against the nozzle 19 progressively increasing the motor valve pressure more and more at the rate determined by the size of the orifice in conduit 58, governed by screw 60, as long as there exists a differential in pressure between bellows 53 and 56.

At the same time Bourdon tube 45 will tend to diminish the effect produced by tube 47 by lowering the control lever 40 in direct ratio to the increase in pressure.

By selecting tube 45 with proportionately larger deflection per unit change in pressure than the tube 47, or by shifting the position of fulcrum point 41 on the lever 42 to obtain the same desired result, differential pressure between bellows 53 and 56 will be automatically neutralized after the motor valve pressure has gradually changed a definite amount proportional to the instantaneous change resulting from the initial movement of control arm 38 and inversely proportional to the ratio of movements per unit change in pressure between "motor valve compensator" tube 45 and auxiliary tube 47.

Thus, the entire control system will be brought to a stable equilibrium corresponding to a new rate of flow with the motor valve pressure changed possibly several pounds and with only a single degree deviation from the control temperature, retaining, in the meantime, utmost stability and evenness of operation of the ordinary throttling controller.

The principal reason for such a mode of control may be easily understood from the diagrams, a, b, c and d. Fig. 2, which represents a schematic drawing of compensating tube 45, and auxiliary tube 47, showing the consecutive steps which this control device assumes in affecting the change of motor valve presure and, finally, attaining the position of stable equilibrium.

For simplicity, it is assumed that the compensator tube 45 moves through twice the distance as coil 47 does for one unit change in pressure.

Fig. 2a represents the control system in equilibrium with five pounds on the motor valve diaphragm, positions of tube 45 and tube 47 and control arm 38 corresponding to the five degrees.

From position of equilibrium:

The change of one degree in temperature of the cooler from five degrees to six degrees will raise the control arm 38 and lever 40 to positions shown in Fig. 2b, increasing motor valve pressure one pound.

The free end of motor valve compensator tube 45 will simultaneously move in the opposite direction from the initial position five pounds to position six pounds, a distance proportional to one pound change in pressure.

Differential of one pound will exist at this point between bellows 53 and 56, shown in Fig. 1, due to restriction to flow by the orifice in conduit 58 controlled by screw 60.

Fluid from bellows 53 will begin to flow past the orifice to bellows 56, slowly increasing pressure in coil 47 from five to six pounds. The free end of the coil at this moment will assume position six pounds on Fig. 2c. With control arm 38 stationary at position six degrees, the movement of tube 47 from five pounds to six pounds will cause one-half pound change in motor valve pressure, because, due to the construction, coil 47 moves only one-half of the distance covered by coil 45, for the same change in pressure.

The motor valve compensator tube 45 will simultaneously assume a position corresponding to the new motor valve pressure of 6½ pounds, as shown in Fig. 2c.

With motor valve pressure at 6½ pounds and pressure of 6 pounds in tube 47 there will be ½ pound differential between bellows 53 and 56 at this point.

The fluid from bellows 53 will continue to flow to bellows 56, increasing pressure in tube 47 from 6 to 6½ pounds, as shown in Fig. 2d, and causing ¼ pound change in motor valve pressure.

Motor valve compensator tube 45 will simultaneously assume a position corresponding to the new motor valve pressure of 6¾ pounds, as shown in Fig. 2d.

With motor valve pressure at 6¾ pounds, and pressure in auxiliary tube 47 of 6½ pounds, differential of only ¼ pound will remain between bellows 53 and 56.

From the above, it is obvious that the decrease in differential between bellows 53 and 56, and coils 45 and 47, will continue in geometric progression until pressure in both coils is automatically equalized with a total increase in the motor valve pressure equal to:

(A) $$S = \frac{a}{1-r}$$

where

S = Total increase in the motor valve pressure per degree change in temperature.
a = Initial instantaneous increase in motor valve pressure due to initial change in position of control arm from the control point.
r = Ratio between two Bourdon tube movements per unit change in pressure, equal to:

$$\frac{\text{Retarded action tube movement (47)}}{\text{Motor compensator tube movement (45)}}$$

Then, retarded increase in motor valve pressure $R = (S-a)$ lbs. per degree.

The stable equilibrium in the control system will be established and maintained until there is an additional advance or retreat of the control arm 38, which action, in every case, will cause motor valve pressure to change a definite amount proportional in magnitude to the initial deviation of control lever, but retarded. The magnitude of "control band" or total deviation of temperature from the control point, required in order to send the motor valve through the entire range of positions, may be determined from the following equation:

(B) $$\text{Control band in degrees} = \frac{P_2 - P_1}{S}$$

$P_2 - P_1$ = Change in motor valve pressure in pounds in order to move it from open to closed position.
S = Total increase in motor valve pressure per degree change in temperature as determined from Equation A.

By proper selection of tubes 45 and 47, or by adjustment of fulcrum point 41, it is possible to make a control band of any desired magnitude most suitable for the process. It is also possible to make adjustment so that a comparatively minute deviation from the control temperature will cause maximum readjustments in the motor valve position without at least unbalancing the system. It must be noted that movement of motor valve tube 45, per unit change in pressure, must be proportionately larger than the corresponding movement of auxiliary retarded tube 47 in order to obtain satisfactory results. For the illustration of control band operation, numerical values are substituted for the conditions previously described, that is, with:

1. Change in temperature of 1 degree (from 5 to 6 degrees) = T
2. Change in pressure of 1 pound (from 5 to 6) = I
3. Ratio of tube 47 to tube 45; $r = \frac{1}{2}$ Total increase in motor valve pressure per degree $$S = \frac{a}{1-r} = \frac{1}{1\frac{1}{2}} = 2 \text{ lbs.} = (I \text{ plus } R)$$

Retarded increase in M. V. pressure $$R = S - a = 2 - 1 = 1 \text{ lb.} = (S - I)$$

Control band in degrees $= \frac{P_2 - P_1}{S} = \frac{15 - 0}{2} =$

7½ degrees

By substituting coil 45 and 47 with ratio $r=\frac{1}{10}$ we obtain:

$$S=\frac{a}{1-r}=\frac{1}{1\frac{1}{10}}= 10 \text{ lbs.}$$

Retarded increase $R=S-a=10-1=9$ lbs.

Control band in degrees =

$$\frac{P_2-P_1}{S}=\frac{15-0}{10}=1.5 \text{ degrees}$$

Fig. 3 (a) and (b), is a diagrammatic illustration of the change in motor valve pressure in the above numerical examples.

In contrast to above, the operation of the ordinary throttling controller may be evaluated under the same conditions as follows (throttling controller with needle valve 59 closed).

Total increase in the motor valve pressure per degree $$S=\frac{a}{1-r}=\frac{1}{1-0}=1 \text{ lb.}$$

Retarded increase = 0

Throttling range in degrees =

$$\frac{P_2-P_1}{S}=\frac{15-0}{1}=15 \text{ degrees}$$

The reason for maintaining ratio $r$ in a band control below unity is evident from the simple substitution into the equation:

$$S=\frac{a}{1-r}$$

with value of $r=1$ $$S=\frac{a}{1-1}=\frac{a}{0}=\text{pounds: infinite}$$

with value of $r=1$, $(r=2)$ $$S=\frac{a}{1-2}=-a \text{ lbs.: negative}$$

That is, when mechanical movements of tubes 45 and 47, in respect to control system, are equal, the retarded readjustment of motor valve pressure becomes infinite making impossible the attainment of automatic stability except by continual reversals of the sensitive element, thus resulting in incessant hunting due to inherent instability. The exact synchronization of rate of retardation and the thermal lag of the system becomes also very critical, which is not at all important with a control band, since stability is attained automatically in the latter case at the conclusion of every cycle. With ratio $r$, more than unity, the change of pressure will be in the opposite direction.

Although the system of control as described is intended for application with a statically balanced control system, it is evident that any fluid operated control system can be made to operate with the above modulating device.

Also, it is understood that in place of an hydraulically filled intercommunicating system, composed of two bellows and Bourdon tube 47, the alternate construction is possible, as shown on Fig. 4, where tube 71 leads to a restriction, such as a needle valve 72, from which the air from the motor valve line is admitted to an expansible chamber 73, of comparatively large capacity, which is directly connected to the inside of Bourdon tube 47 by means of tubing 74. By restricting passage of air through the orifice controlled by valve 72 the expansion of Bourdon tube 47 may be retarded as desired, otherwise the device will operate as one described above.

In the above description, reference was made to the control of temperature only, for the purpose of illustration, and it is clearly understood that the same type of control may be applied just as well to the control of pressure, flow, or other variables, without departing from the intent of the invention.

I claim:

1. In a control mechanism of the character described having a variable bleed for governing the operating pressure in the system by which the magnitude of a condition is governed, primary means for varying said bleed responsively to the magnitude of said condition, and a plurality of means responsive to changes in said operating pressure, one of which has a relatively large and immediate effect on the operating pressure, and another of which has a relatively smaller and retarded effect on said operating pressure.

2. In a control mechanism of the character described having a variable bleed for governing the operating pressure in the system by which the magnitude of a condition is governed, primary means for varying said bleed responsively to the magnitude of said condition, and a plurality of means responsive to changes in said operating pressure, one of which has a relatively large and immediate effect on the operating pressure partially counteracting the effect produced by the primary means, and another of which has a relatively smaller and retarded effect on the operating pressure augmenting the effect imparted by the primary means.

3. In a control mechanism, variable means for governing the magnitude of a condition, a primary element responsive to changes in said condition for controlling said variable, and a plurality of means responsive to changes in said variable, one of which has a relatively large and immediate effect on said variable, and another of which has a relatively smaller and retarded effect on same.

4. In combination with a pressure operated motor valve for controlling a medium affecting the magnitude of a condition to be controlled, a pilot mechanism utilizing an independent source of pressure for operating said motor valve and ordinarily exhausting to the atmosphere, an exhaust valve governing the exhaust from said mechanism, a primary element responsive to variations in said condition controlling said exhaust valve, and a plurality of elements responsive to changes in said operating pressure combining to decrease the effect imparted by the primary element at a progressively decreasing rate, one of which has a relatively large and immediate effect on the operating pressure and another of which has a relatively smaller and retarded effect on the operating pressure.

5. In a control mechanism of the character described, having a pressure system for operating a servo motor by which the magnitude of a condition is governed, a bleed for said system, a valve for controlling said bleed comprising a plurality of members having a relative movement by which the amount of said bleed is governed, a primary element responsive to the magnitude of said condition operatively connected to one of said valve members, a compensating element responsive to the pressure in said system in operative connection with one of said valve members for reducing the effect imparted by said primary element, and a drift element responsive to said operating pressure in operative connection with one of said valve members, the movement of said drift element being retarded and less than the movement of said compensating element, said drift element and compensating element being actuated by a change in operating pressure produced by the primary element and combining a series of opposing forces to gradually change the magnitude of operating pressure in the direction of initial change produced by the primary element at a progressively diminishing rate.

6. In a control mechanism of the character described, and in combination with a motor valve for controlling a medium affecting the magnitude of a condition, a pilot mechanism utilizing an independent source of pressure for operating said motor valve and ordinarily exhausting to the atmosphere, a valve for controlling the exhaust from said mechanism comprising a plurality of members capable of relative movement, a primary element responsive to the magnitude of said condition for affording relative movement to said valve members, a compensating element responsive to the motor valve operating pressure for affording a relative movement to said valve members opposite to and less than the relative movement afforded by said primary element, and a drift element responsive to the motor valve pressure, affording a retarded relative movement to said valve members opposite to and less than the relative movement afforded by said compensating element, said compensating and drift elements combining to afford a series of opposing forces to gradually increase the effect of the movement of said primary element on the operating pressure at a progressively diminishing rate.

7. In a mechanism of the character described, having a pressure system for operating a valve by which the magnitude of a condition is governed, a nozzle having an exhaust port for said pressure, a movable flapper for regulating the exhaust from said port and governing the pressure in said system, a primary element responsive to changes in said condition operatively connected to said flapper to effect corresponding changes in said operating pressure, a compensating element responsive to changes in said operating pressure in operative relation with said flapper to impart a movement relative to said nozzle opposite to and less than the initial relative movement afforded by said primary element, and a drift element responsive to changes in said operating pressure operatively connected with said flapper for imparting a movement relatively to said nozzle opposite to and less than that imparted by said compensating element, said compensating and drift elements combining to decrease the initial change in said pressure system imparted by said primary element at a progressively decreasing rate.

8. In a control mechanism of the character described having a variable bleed for governing the operating pressure in a system by which the magnitude of a condition is governed, primary means for varying said bleed responsive to the magnitude of said condition, a plurality of means responsive to changes in said operating pressure one of which has a relatively large and immediate effect on the operating pressure and another of which has a relatively smaller effect on said operating pressure, and means for adjustably retarding the effect produced by said last mentioned means.

9. In a control mechanism of the character described, having a variable bleed for governing the operating pressure in a system by which the magnitude of a condition is governed, primary means for varying said bleed responsive to the magnitude of said condition, a plurality of means responsive to changes in said operating pressure one of which has a relatively large and immediate effect on the operating pressure and another of which has a relatively smaller effect on said operating pressure, means for adjustably retarding the effect produced by said last mentioned means, and means for changing the ratio of relative movement of said plurality of means per unit deviation of the primary means.

10. In a control mechanism of the character described, having a variable bleed for governing the operating pressure in a system by which the magnitude of a condition is governed, primary means for varying said bleed responsive to the magnitude of said condition, a plurality of means responsive to changes in said operating pressure one of which has a relatively large and immediate effect on the operating pressure and another of which has a relatively smaller effect on said operating pressure, and means for changing the ratio of relative movement of said plurality of means per unit deviation of the primary means.

11. In a control mechanism of the character described, having a variable bleed for governing the operating pressure in a system by which the magnitude of a condition is governed, primary means for varying said bleed responsive to the magnitude of said condition, a plurality of means responsive to changes in said operating pressure one of which has a relatively large and immediate effect on the operating pressure and another of which has a relatively smaller effect, a chamber having a fluid in operative connection with said last mentioned means, means for subjecting the fluid in said chamber to the pressure in said operating system, and means between said chamber and the operating pressure system for retarding the transmission of said pressure, 12. In a control mechanism of the character described having a variable bleed for governing the operating pressure in a system by which the magnitude of a condition is governed, primary means for varying said bleed responsive to the magnitude of said condition, and a plurality of means responsive to changes in said operating pressure, one of which has a relatively large and immediate effect on the operating pressure, and another of which has a relatively smaller effect, a chamber having a fluid in operative connection with said last mentioned means, a second chamber having a fluid subjected to the pressure in said operating system, and means for subjecting the fluid in said first chamber to the pressure in said second chamber at a variable rate.

NIKOLAI BELAEF.